(12) United States Patent
Köhler et al.

(10) Patent No.: US 7,147,959 B2
(45) Date of Patent: Dec. 12, 2006

(54) PROCESS FOR THE MANUFACTURE OF MEMBRANE-ELECTRODE-ASSEMBLIES USING CATALYST-COATED MEMBRANES

(75) Inventors: Joachim Köhler, Gründau/HG (DE); Knut Fehl, Schlüchtern (DE); Anita Krämer, Neuberg (DE); Sandra Wittpahl, Obertshausen (DE); Klaus Schaack, Obernburg (DE)

(73) Assignee: Umicore AG & Co. KG, Hanau (DE)

( * ) Notice: Subject to any disclaimer, the term of this patent is extended or adjusted under 35 U.S.C. 154(b) by 584 days.

(21) Appl. No.: 10/159,229

(22) Filed: May 31, 2002

(65) Prior Publication Data

US 2003/0224233 A1  Dec. 4, 2003

(30) Foreign Application Priority Data

May 31, 2002  (EP) ................... 02012097

(51) Int. Cl.
  *H01M 4/94* (2006.01)
  *H01M 4/88* (2006.01)
(52) U.S. Cl. ................... 429/42; 429/44; 502/101
(58) Field of Classification Search ............... 29/623.1, 29/623.4; 429/33, 40, 41, 42
See application file for complete search history.

(56) References Cited

U.S. PATENT DOCUMENTS 3,522,095 A    7/1970  Barker, Jr. et al.
5,300,206 A *  4/1994  Allen et al. ............... 429/42 X
5,910,378 A *  6/1999  Debe et al. .................... 429/42
6,057,054 A *  5/2000  Barton et al. .................. 429/42
6,291,091 B1 * 9/2001  Preischl et al. ............... 429/30
6,713,207 B1 * 3/2004  Tsusaka et al. ............... 429/40

FOREIGN PATENT DOCUMENTS

| EP | 0 918 362 A2 | 5/1999 |
| EP | 1 037 295 A1 | 9/2000 |
| EP | 1 176 652 A2 | 1/2002 |
| EP | 1 042 837 B1 | 2/2002 |
| JP | 07220741 | 8/1995 |

OTHER PUBLICATIONS

European Search Report, pp. 1-2, (2002).

* cited by examiner

*Primary Examiner*—Stephen J. Kalafut
(74) *Attorney, Agent, or Firm*—Kalow & Springut LLP; John J. Santalone, Esq.

(57) ABSTRACT

The present invention relates to the field of electrochemical cells and fuel cells, more specifically to polymer-electrolyte-membrane (PEM) fuel cells and describes a process for the manufacture of membrane-electrode-assemblies (MEAs) containing five layers. The five-layer MEA is assembled together by means of a lamination process involving an adhesive component. The anode gas diffusion layer, the catalyst-coated membrane and the cathode gas diffusion layer are combined together by a low temperature/low pressure lamination process. Handling of the MEAs and assembly of the products into PEMFC and DMFC stacks is simplified. Less damage and perforation of the catalyst-coated membrane occurs and thus the performance of the five-layer MEAs is significantly improved.

20 Claims, 2 Drawing Sheets

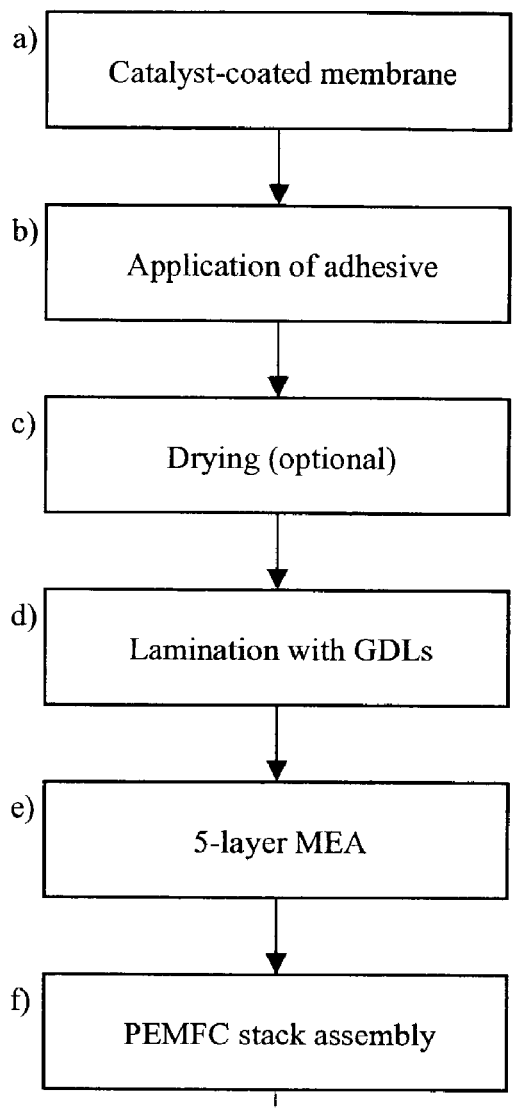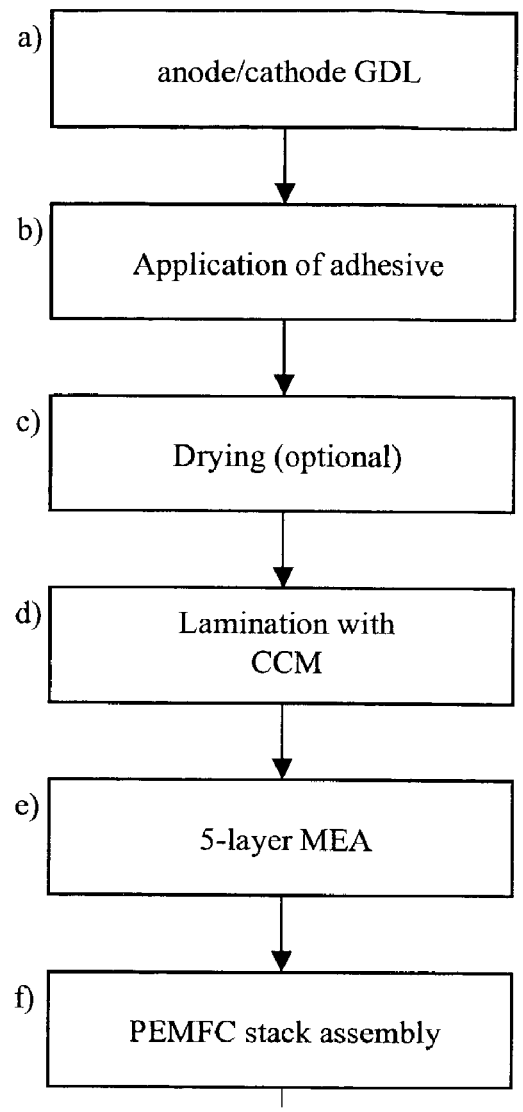
Figure 1                    Figure 2

PROCESS FOR THE MANUFACTURE OF MEMBRANE-ELECTRODE-ASSEMBLIES USING CATALYST-COATED MEMBRANES

FIELD OF INVENTION

The present invention relates to the field of electrochemical cells and fuel cells, more specifically to polymer-electrolyte-membrane (PEM) fuel cells and describes a process for the manufacture of membrane-electrode-assemblies (MEAs).

BACKGROUND

Fuel cells convert a fuel and an oxidising agent into electricity, heat and water at two spatially separated electrodes. Hydrogen or a hydrogen-rich gas can be used as the fuel and oxygen or air as the oxidising agent. The energy conversion process in the fuel cell is distinguished by particularly high efficiency. For this reason, fuel cells are gaining increasing importance as an alternative to conventional combustion engines. Furthermore, they are used in stationary combined-heat-and-power units (CHP), as well as in portable applications.

The polymer electrolyte membrane fuel cell (PEMFC) and the direct methanol fuel cell (DMFC, a variation of the PEMFC, powered directly by methanol instead of hydrogen) are suitable for use as energy converters thanks to their compact construction, their power density and high efficiency. The technology of fuel cells is broadly described in the literature, see for example K. Kordesch and G. Simader, "Fuel Cells and its Applications," VCH Verlag Chemie, Weinheim (Germany) 1996.

In the following section, the technical terms used in the present patent application are described in greater detail:

A catalyst-coated membrane (hereinafter abbreviated "CCM") consists of a polymer electrolyte membrane that is provided on both sides with a catalytically active layer. One of the layers takes the form of an anode for the oxidation of hydrogen, and the second layer takes the form of a cathode for the reduction of oxygen. As the CCM consists of three layers (anode catalyst layer, ionomer membrane and cathode catalyst layer), it is often referred to as "three-layer MEA."

Gas diffusion layers ("GDLs"), sometimes referred to as gas diffusion substrates or backings, are placed onto the anode and cathode layers of the CCM in order to bring the gaseous reaction media (hydrogen and air) to the catalytically active layers and, at the same time, to establish an electrical contact. GDLs are usually carbon-based substrates, such as carbon fibre paper or woven carbon fabric, which are highly porous and allow the reaction gases a good access to the electrodes. Furthermore, they are hydrophobic in order to remove the product water from the fuel cell. GDLs can be coated with a microlayer to improve the contact to the membrane. They can be tailored specifically into anode-type GDLs or cathode-type GDLs, depending on which side they are built into a MEA. Furthermore, they can be coated with a catalyst layer for subsequent lamination to the ionomer membrane. These catalyst-coated GDLs are frequently referred to as "catalyst-coated backings" (abbreviated "CCBs") or gas diffusion electrodes ("GDEs").

Generally, two different technologies exist for the production of membrane-electrode-assemblies:

In the first technology (herein called "CCM-technology") the catalyst layers are applied directly to the ionomer membrane resulting in a catalyst-coated membrane (CCM). This technology is described for example in EP 1 037 295 B1, EP 1 176 652 A2 and other pending applications of the applicant. The advantage of this process is the close, intimate contact of the catalyst layer with the membrane, which is achieved at very mild, benign process conditions. The drawback is that the catalyst-coated membrane (CCM) needs to be assembled separately with two GDLs when making a fuel cell stack.

In the second alternative technology (herein called "CCB-technology," where CCB stands for catalyst-coated backings), the catalyst layers are applied to the gas diffusion layers (GDLs) first. In a following step, two gas diffusion layers are assembled by means of heat and pressure with the ionomer membrane to yield a five-layer MEA. This process is often referred to as hot-pressing or lamination. High pressures and high temperatures are necessary in this process for lamination of the CCB with the ionomer membrane. This may lead to membrane damage or perforation, particularly if thin ionomer membranes (with less than 40 μm thickness) are used. Furthermore, the catalyst layer on the GDL substrate may be damaged and/or densified, which results in a low catalyst utilisation and a low performance.

In EP 1 042 837 B1, a method for manufacturing of a five-layer MEA is disclosed. The processes described therein are run in a continuous way and are based on co-extrusion, extrusion and/or lamination steps. The processes described in EP 1 042 837 B1 are not applicable to the manufacture of MEA products, which contain an ionomer membrane with selectively coated active electrode areas. Furthermore, no details are given in respect to performance and quality of the MEAs produced according to the claimed processes.

Additionally, in the assembly of a PEMFC or DMFC stack, the three aforementioned components must be combined to form a sandwich structure. In this assembly process, the appropriate GDLs should be placed exactly on top of the catalyst layers on both sides of the CCM to match the active area of the catalyst layers. Furthermore, additional components, e.g., sealing materials, should be applied. Thus, the stack assembly process comprises various alignment steps with different components and is very time-consuming and expensive.

There is a need to develop more efficient means by to make MEAs. The present invention provides a manufacturing process for five-layer MEAs that is straightforward, simple and fast. The process should be based on the use of catalyst-coated membranes (CCMs) and should be easily scaleable to a continuous high-volume manufacturing process.

SUMMARY OF INVENTION

The present invention relates to the field of electrochemical cells and fuel cells, more specifically to polymer-electrolyte-membrane (PEM) fuel cells and describes a process for the manufacture of membrane-electrode-assemblies (MEAs) containing five layers. The MEAs are manufactured by a new, very cost effective way by the combination of catalyst-coated membranes (CCMs) with two gas diffusion layers (GDLs).

The five-layer MEA is assembled together by means of a lamination process involving an adhesive component. The anode gas diffusion layer, the catalyst-coated membrane and the cathode gas diffusion layer are combined together by a low temperature/low pressure lamination process. Handling of the MEAs and assembly of the products into PEMFC and DMFC stacks is simplified. Less damage and perforation of the catalyst-coated membrane occurs and thus the performance of the five-layer MEAs is significantly improved.

The present invention refers to the previously described "CCM-technology" and discloses a manufacturing process for five-layer MEAs based on catalyst-coated membranes. As already outlined, MEAs manufactured according to the CCM-technology consist of three different parts: the catalyst-coated membrane, the anode GDL and the cathode GDL.

Under one embodiment, the present invention provides a process for manufacturing a five-layer membrane-electrode-assembly (MEA), said process comprising:
 a. applying an adhesive component to at least one of the components selected from the group consisting of an anode gas diffusion layer, a cathode gas diffusion layer and a catalyst-coated membrane; and
 b. laminating said anode gas diffusion layer, said cathode gas diffusion layer and said catalyst-coated membrane.

The present invention also provides for a membrane-electrode-assembly comprising an anode gas diffusion layer, a catalyst-coated membrane, a cathode gas diffusion layer, and an adhesive component that have been laminated.

BRIEF DISCUSSION OF THE FIGURES

FIG. 1 is a schematic drawing of one embodiment of the present invention in which an adhesive component is applied to the anode and the cathode side of a catalyst-coated membrane in a desired pattern, and optionally subsequently dried. The CCM containing the adhesive component is then sandwiched between the anode and the cathode GDL and the assembly is subsequently laminated at mild, benign conditions (low temperature and low pressure) to yield a five-layer MEA.

FIG. 2 is a schematic drawing of a second embodiment of the present invention, in which the adhesive component is applied to the GDL substrates in a desired pattern. The adhesive-coated GDLs are optionally subsequently dried and then laminated with the catalyst-coated membrane to form the five-layer MEA.

DETAILED DESCRIPTION

Figure 3:
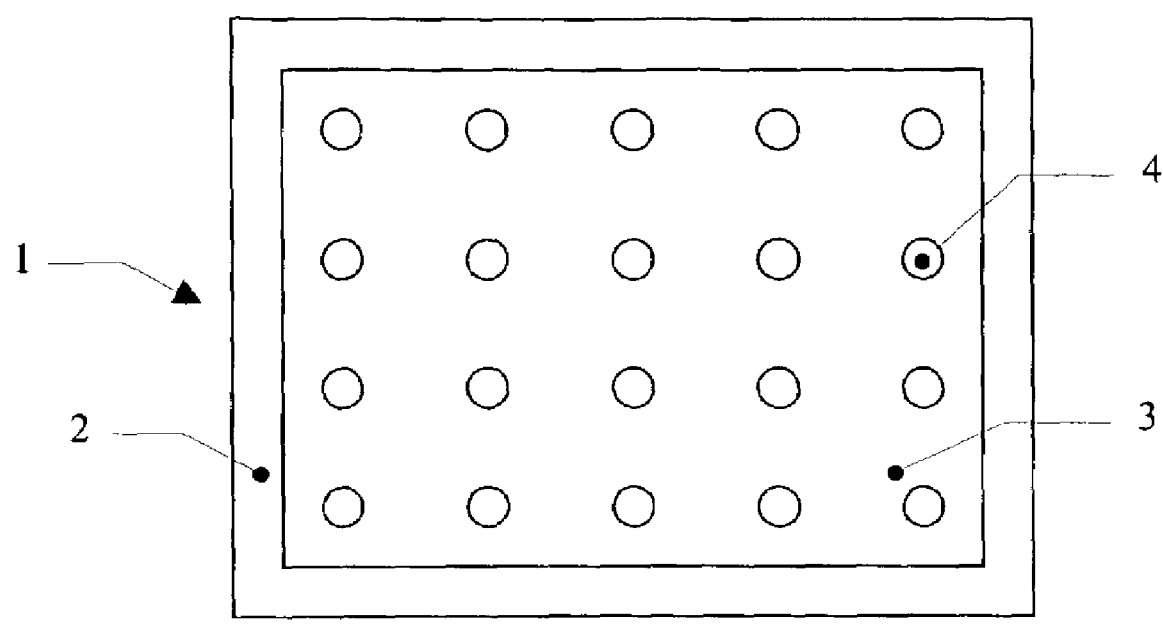
FIG. 3 is a representation of a view of a catalyst-coated membrane produced according to the present invention.

According to the present invention, a process is provided for producing five-layered MEAs. A five-layer MEA produced according to the present invention comprises an anode gas diffusion layer, a catalyst-coated membrane and a cathode gas diffusion layer. The anode gas diffusion layer, the cathode gas diffusion layer and the catalyst-coated membrane are assembled together by means of a lamination process using an adhesive component.

This disclosure is not a primer on catalysts of membrane-electrode assemblies. Basic concepts known to persons skilled in the art have not been set forth in detail.

A membrane-electrode-assembly ("five-layer MEA") is the central component in a polymer-electrolyte-membrane (PEM) fuel cell and consists of five layers: the anode GDL, the anode catalyst layer, the ionomer membrane, the cathode catalyst layer and the cathode GDL. A MEA can be manufactured by combining a CCM (catalyst-coated membrane) with two GDLs (on the anode and the cathode side) or, alternatively, by combining a ionomer membrane with two catalyst-coated backings (CCBs) at the anode and the cathode side. In both cases, a five-layer MEA product is obtained. The present invention is related to the manufacture of a five-layer MEA based on the combination of a CCM with two gas diffusion layers (GDLs).

PEMFC and DMFC stacks are assembled from these membrane-electrode-assemblies by stacking numerous individual MEAs and bipolar plates onto each other. Depending on the lateral dimensions and the number of MEA units stacked, various power ranges of the PEMFC stack can be obtained.

According to the present invention, the polymer electrolyte membrane consists of proton-conducting polymer materials. These materials are also referred to below as ionomers for short. Tetrafluoroethylene-fluorovinyl-ether copolymer with sulfonic acid groups is preferably used. This material is marketed for example by E. I. DuPont under the trade name Nafion®. However, other, especially fluorine-free, ionomer materials such as sulfonated polyether ketones or aryl ketones or polybenzimidazoles may also be used. Suitable ionomer materials are described by O. Savadogo in "Journal of New Materials for Electrochemical Systems" I, 47–66 (1998). For use in fuel cells, these membranes generally have a thickness of between 10 and 200 µm.

The anode and cathode layers contain electrocatalysts, which catalyse the respective reaction (oxidation of hydrogen at the anode and reduction of oxygen at the cathode). The metals of the platinum group of the periodic table are preferably used as the catalytically active components. For the most part, supported catalysts are used, in which the catalytically active platinum group metals have been fixed in nano-sized particle form to the surface of a conductive support material. The average particle size of the platinum group metal is between about 1 and 10 nm. Carbon blacks with particle sizes of 10 to 50 nm and high electrical conductivity have proven to be suitable as support materials.

According to the present invention, the three components (CCM, anode-GDL and cathode-GDL) are combined to form a five-layer MEA by means of a lamination process using an adhesive component. In one embodiment of the invention, which is depicted in FIG. 1, an adhesive component (b) is applied to the anode and the cathode side of a catalyst-coated membrane (a) in a desired pattern, and optionally subsequently dried (c). The CCM containing the adhesive component is then sandwiched between the anode and the cathode GDL and the assembly is subsequently laminated (d) at mild, benign conditions (low temperature and low pressure) to yield a five-layer MEA (e), which may be used to form a PEMFC stack assembly (f).

In a second embodiment of the present invention, which is depicted in FIG. 2, the adhesive component (b) is applied to the GDL substrates (a) in a desired pattern. The adhesive-coated GDLs are optionally subsequently dried (c) and then laminated with the catalyst-coated membrane (d) to form the five-layer MEA (e), which may be used to form a PEMFC stack assembly (t).

FIG. 3 shows a view onto a catalyst-coated membrane (1) with dots of adhesive component (4). Reference numeral (2) denotes the membrane and (3) denotes the active area of the catalyst layers. As shown in FIG. 3, generally the lateral dimensions of the active area of the catalyst layers are smaller than those of the membrane, thus leaving an uncoated circumferential area for sealing purposes. In FIG. 3 the dots of adhesive component are arranged in a desired pattern that may be varied in many ways to give optimum bonding of the GDLs to the CCM.

In a third embodiment of the present invention, the adhesive component is applied both to the catalyst-coated membrane, as well as to the GDL substrates.

Variations of these embodiments are possible. For example, the adhesive component may be applied to the CCM on the first side (for example, to the anode side) and to the GDL on the second side (for example, to the cathode side).

In all these various embodiments, a five-layer MEA is obtained in a simple lamination process. Due to the low lamination pressures (preferably between 2 and 20 bar, more preferably between 2 and 10 bar) and low temperatures (preferably between 20° C. and 130° C.) applied, the ionomer membrane and the CCM are not damaged, perforated or compressed. Furthermore, the process of the present invention can be performed continuously when using flexible CCM and GDL materials supplied on rolls. Thus, high volume reel-to-reel MEA production can be accomplished.

As the adhesive component, generally all materials can be used that develop adhesive properties upon application of heat and pressure to substrates. Examples include, but are not limited to thermoplastic and duroplastic polymer compositions, hot-melt adhesives, one- and two-component adhesives, polyolefin-, polyester-, bakelite-, epoxy-, silicone-, acrylic-, urethane- or polyimide-based polymers, as well as perfluorinated polymers and ionomer materials and mixtures thereof. The polymer compositions may be filled with various filler materials. Examples for non-conductive fillers include, but are not limited to alumina, silica, titania and the like. Examples for conductive fillers include, but are not limited to precious metal or base metal powders, carbon blacks, graphite and the like. Furthermore, they may be filled with catalytically active components that include but are not limited to precious metal blacks or carbon-supported electrocatalysts. Optionally, additives such as hardening agents, defoaming agents, wetting agents, preservatives, etc. may be added.

The adhesive component is applied selectively in any desired pattern onto the active area of the CCM or the GDL. In order to avoid the blocking and masking of too many catalytically active sides in the electrodes, the adhesive pattern should not be too dense. Good results are achieved with the adhesive dots occupying between 1 and 20%, preferably between 1 and 10%, of the active area of the catalyst layers. Examples for adhesive patterns are thin lines or small dots or deposits at the corners and/or in the middle of the active area. If the adhesive component is deposited in a very dense pattern across the active area, reduced performance may occur. Furthermore, the amount of adhesive component should be limited to the range of 0.01 to 10, preferably 0.01 to 1 mg adhesive component/cm$^2$ of active area to avoid MEA performance losses.

Catalyst-coated membranes (three-layer MEAs) useful in the present invention can be manufactured by printing of anode and cathode electrode layers to the front and back side of an ionomer membrane as described in EP 1 037 295 B1, EP 1 176 652 A2 and other pending applications of the applicant. However, CCMs manufactured by different methods (e.g., decal processes, doctor blading, tape-transfer methods, thin-film (PVD) evaporation methods and the like) can be incorporated as well.

As GDLs, various commercially available materials known in fuel cell technology can be used. Examples include but are not limited to carbon paper, carbon fibers, carbon cloth, woven carbon mesh, needled felt, knitted fabric, etc. The porous carbon supports may be wet proofed and may contain a microlayer.

The application of the adhesive component is conducted by any convenient method known in the art. Examples include but are not limited to spraying, dispensing, screen printing, stencil printing, stamping, doctor blading or, in the case of a hot-melt adhesive, with a heated needle or a heated dispenser unit. In the case of a continuous production, the application of the adhesive component may be done automatically and may be integrated into a continuous manufacturing process.

After application of the adhesive component, a drying process may be performed. Depending on the solvent content of the adhesive composition, appropriate drying conditions are selected. Suitable drying temperature ranges are e.g., 40 to 120° C. with drying times of e.g., 0.5 to 60 minutes. In the case of the application of hot-melt adhesives and solvent-free systems, the drying step may be omitted.

The lamination process of the three MEA parts can be performed by any process employing heat and pressure (i.e., hot-pressing, hot-rolling, calendering, stamping and the like). In comparison to the lamination conditions in the "CCB-process" previously mentioned (temperatures typically above 150° C., pressure typically above 20 bar), the lamination conditions in the present invention are considerably milder (preferably pressure up to 10 bar and temperatures up to 130° C.). As a consequence, the ionomer membrane and the CCM are not damaged, perforated or compressed.

Having thus described and exemplified the invention with a certain degree of particularity, it should be appreciated that the following claims are not to be so limited but are to be afforded a scope commensurate with the wording of each element of the claim and equivalents thereof.

EXAMPLES

Example 1

A catalyst-coated membrane (CCM Type R221, reformate operation/full humidification, active area 50 cm$^2$; OMG AG & Co. KG, Hanau) was used as the CCM component. The anode electrode side contained a PtRu/C electrocatalyst and had a total precious metal loading of 0.45 mg (0.3 mg Pt/cm$^2$ and 0.15 mg Ru/cm$^2$), the cathode side contained a Pt/C electrocatalyst with a Pt loading of 0.4 mg Pt/cm$^2$.

The anode GDL, hereinafter referred to as GDL(A), was prepared as follows: A sheet of carbon fiber paper (thickness 350 µm, porosity 85%; supplied by SGL Carbon Group, type SIGRACET®) was wet proofed with a water based PTFE solution (type Hostaflon TF 5032, Dyneon®g, Gendorf) to a PTFE content of 16 wt. % and a microlayer, consisting of carbon black and PTFE was applied to one side of the carbon paper by screen printing. The cathode GDL, hereinafter referred to as GDL(C), was prepared accordingly, however, the PTFE content was reduced to 9 wt. % in the wet-proofing process. A polyolefin-based hot melt adhesive (Type Technomelt, Teroson/Henkel Co.) was sprayed as a fine network onto the microlayer-coated side of GDL(A) and GDL(C). Application of the hot-melt adhesive was done with a heated dispenser at 175° C. The quantity of adhesive applied to each GDL was in the range of 0.1 mg/cm$^2$.

In the subsequent lamination process, the catalyst-coated membrane (CCM Type R221) was combined with the two GDLs in the sequence GDL(A)—anode layer-CCM-cathode layer—GDL(C) and hot-pressed at 10 bar pressure at 130° C. for 1 minute. A very flexible five-layer composite MEA was obtained. The five layers adhered very well together and could be easily handled and built into a PEMFC stack.

The 5-layer MEA was combined with sealings and submitted to a performance test in a PEMFC single cell. The electrochemical data were very favourable (Table 1).

Example 2

A catalyst-coated membrane (CCM Type R221, active area 50 cm², OMG AG & Co. KG) was used as the CCM component. GDL(A) and GDL(C) were prepared as described in example 1. A catalyst-containing paste was formulated according to the following composition:

| | |
|---|---|
| 15.0 g | Electrocatalyst Elyst ™ A 40 (OMG AG, Hanau) |
| 50.0 g | Nafion ® SE 10072 (10 wt. % in water, DuPont) |
| 35.0 g | Dipropylene glycol |
| 100.0 g | |

The catalyst-containing paste was applied in a fine dot pattern onto the anode side of the active area of the CCM. The diameter of the dots was 1 mm, an automatic dispenser unit with a needle of 0.5 mm diameter was used. In a second step, the same amount of catalyst-containing paste was applied onto the microlayer-coated side of the cathode backing GDL(C). After drying at 80° C. for 2 minutes, the CCM was sandwiched between anode GDL(A) and cathode GDL(C). This assembly was subsequently hot pressed at 120° C. at a pressure of 8 bar. A flexible five-layer MEA with good electrical performance was obtained (Table 1).

Example 3

A catalyst-coated membrane (CCM Type R221, active area 50 cm², OMG AG & Co. KG) was used. Anode and cathode GDLs were prepared as described in example 1. A carbon black-containing adhesive paste was prepared with the following composition:

| | |
|---|---|
| 20.0 g | Carbon Black Shawinigan (Chevron) |
| 60.0 g | Nafion ® SE 10072 (10 wt. % in water, DuPont) |
| 20.0 g | Dipropylene glycol |
| 100.0 g | |

The carbon black-containing adhesive paste was selectively screen printed onto the microlayer-coated side of the anode and the cathode GDLs. The drying step was omitted. The further processing was as described in example 2. A five-layer MEA with very good electrical performance was obtained (Table 1)

Electrochemical Testing

The five-layer MEAs were tested in a PEMFC single cell with an active area of 50 cm² running on reformate/air conditions with simulated natural gas reformate (composition 40 vol.-% hydrogen, 40 vol.-% nitrogen, 20 vol.-% carbon dioxide, 40 ppm carbon monoxide and additional 2 vol.-% air bleed). The operating gas pressure was ambient (1 bar) and the cell temperature was 70° C. As shown in Table 1, the five-layer MEAs manufactured according to the present invention possess a high cell voltage in the range of 630 mV at a current density of 600 mA/cm².

TABLE 1

Results of electrochemical testing of five-layer MEAs

| | Example 1 | Example 2 | Example 3 |
|---|---|---|---|
| Cell Voltage @ 600 mA/cm² (mV) | 620 | 630 | 615 |

The invention claimed is:

1. A process for manufacturing a five-layer membrane-electrode-assembly, wherein said membrane-electrode-assembly comprises an anode gas diffusion layer, an anode catalyst layer, an ionomer membrane, a cathode catalyst layer and a cathode gas diffusion layer, wherein said anode catalyst layer, said ionomer membrane and said cathode catalyst layer are each part of a catalyst-coated membrane and wherein each of the diffusion layers and the catalyst-coated membrane have an active area, said process comprising:
   a. applying an adhesive component to at least one of the components selected from the group consisting of said anode gas diffusion layer, said cathode gas diffusion layer and said catalyst-coated membrane, in a manner so that the adhesive component occupies between 1 and 20% of the active area of the anode gas diffusion layer, the cathode gas diffusion layer, or the catalyst-coated membrane; and
   b. laminating said anode gas diffusion layer, said cathode gas diffusion layer and said catalyst-coated membrane.

2. A process according to claim 1, wherein the amount of adhesive component is limited to the range of 0.01 to 10 mg adhesive/cm² of the active area.

3. A process according to claim 1, wherein the adhesive component is applied to either or both said anode gas diffusion layer or said cathode gas diffusion layer prior to said laminating step.

4. A process according to claim 1, wherein the adhesive component is applied to the catalyst-coated membrane prior to said laminating step.

5. A process according to claim 4, wherein said catalyst-coated membrane is comprised of a first side to which the anode gas diffusion layer will be adjacent and a second side to which the cathode gas diffusion layer will be adjacent, and the adhesive component is applied to the both the first side and the second side, prior to said laminating step.

6. A process according to claim 1, wherein the laminating is performed in a temperature range of between 20° C. and 130° C.

7. A process according to claim 1, wherein the laminating is performed in a pressure range between 2 bar and 20 bar.

8. A process according to claim 1, wherein the adhesive component comprises an organic polymeric material.

9. A process according to claim 8, wherein the adhesive component comprises a thermoplastic or duroplastic polymer, or a conductive filler.

10. A process according to claim 9, wherein said adhesive component further comprises a solvent.

11. A process according to claim 9, wherein said adhesive component further comprises an additive.

12. A process according to claim 1, wherein the adhesive component is applied by a method selected from the group consisting of coating, spraying, printing, dispensing, stamping, using a transfer tape and using a hot-melt dispenser.

13. A process according to claim 1, wherein the adhesive component is dried after application in a temperature range of 40 to 120° C.

14. A process according to claim 1, wherein the adhesive component is applied in the form of adhesive dots selectively in a desired pattern.

15. A process according to claim 14, wherein the adhesive dots occupy between 1 and 10% of said active area.

16. A membrane-electrode-assembly comprising an anode gas diffusion layer, a catalyst-coated membrane, a cathode gas diffusion layer, and an adhesive component that have been laminated, wherein each of the diffusion layers and the membrane have an active area and the adhesive component occupies between 1 and 20% of the active area of the anode gas diffusion layer, the cathode gas diffusion layer, or the catalyst-coated membrane.

17. The membrane-electrode-assembly of claim 16, wherein said adhesive component comprises an organic polymer material.

18. The membrane-electrode assembly of claim 16, wherein said adhesive component comprises a thermoplastic or duroplastic polymer, or a conductive filler.

19. A fuel cell stack comprising the membrane-electrode-assembly of claim 16.

20. The membrane-electrode-assembly to claim 16 wherein the adhesive component occupies between 1 and 10 % of said active area.

* * * * *